(12) United States Patent
Lee et al.

(10) Patent No.: US 8,385,044 B2
(45) Date of Patent: Feb. 26, 2013

(54) FILM CAPACITOR

(75) Inventors: Jeongyun Lee, Gyeonggi-do (KR); Daewoong Han, Gyeonggi-do (KR); Gubae Kang, Yongin-Si (KR); Wooyong Jeon, Seoul (KR); In-Pil Yoo, Gyeonggi-do (KR); Jeongbin Yim, Seoul (KR); Dongjin Nam, Gyeonggi-do (KR); Jinhwan Jung, Gyeonggi-do (KR); Junghong Joo, Gyeonggi-do (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 555 days.

(21) Appl. No.: 12/582,823

(22) Filed: Oct. 21, 2009

(65) Prior Publication Data

US 2010/0128410 A1 May 27, 2010

(30) Foreign Application Priority Data

Nov. 24, 2008 (KR) .............................. 2008-0116609

(51) Int. Cl.
*H01G 2/08* (2006.01)
*H01G 4/005* (2006.01)
(52) U.S. Cl. .................................... 361/274.3; 361/303
(58) Field of Classification Search .................. 361/303, 361/274.1, 274.2, 274.3, 311
See application file for complete search history.

(56) References Cited

U.S. PATENT DOCUMENTS

| 1,843,622 | A  | * | 2/1932 | Norton ........................ 361/274.1 |
| 8,102,653 | B2 | * | 1/2012 | Hamatani ....................... 361/699 |
| 2003/0175537 | A1 | * | 9/2003 | Furuya et al. ................. 428/480 |
| 2009/0141419 | A1 | * | 6/2009 | Pal et al. ..................... 361/274.3 |
| 2010/0155158 | A1 | * | 6/2010 | Azuma et al. ................. 180/65.8 |

FOREIGN PATENT DOCUMENTS

| JP | 2003059752 A | | 2/2003 |
| JP | 2004-304057 A | | 10/2004 |
| JP | 2005-057007 A | | 3/2005 |
| JP | 2005-210069 A | | 8/2005 |
| JP | 2007-180155 A | | 7/2007 |
| JP | 2008187046 A | * | 8/2008 |
| WO | WO 2008123269 A1 | * | 10/2008 |

* cited by examiner

Primary Examiner — Eric Thomas
(74) Attorney, Agent, or Firm — Edwards Wildman Palmer LLP; Peter F. Corless

(57) ABSTRACT

A film capacitor is provided that includes a case in which a film cell is incorporated and a heat radiating plate including a heat absorption unit being positioned adjacent to the film cell while not being in contact with the film cell for absorbing heat and a heat radiating unit being exposed to the outside of the case. Preferred film capacitors can perform a stable operation and have durable lifespan, even when an inverter adopting the film capacitor is mounted on a trunk room and an engine room, by effectively cooling heat generated from a film cell of the film capacitor.

7 Claims, 6 Drawing Sheets

FILM CAPACITOR

CROSS-REFERENCE TO RELATED APPLICATIONS

The present application claims priority to Korean Patent Application Number 10-2008-0116609 filed Nov. 24, 2008, the entire contents of which application is incorporated herein for all purposes by this reference.

TECHNICAL FIELD

The present invention relates to a film capacitor used for an inverter of a hybrid vehicle.

BACKGROUND ART

An inverter in a hybrid vehicle supplies electricity required for driving a motor/generator and charges a high-voltage battery with the electricity generated by the motor/generator, between the high-voltage battery and the motor/generator.

Referring to FIG. 1, an inverter 500 includes a capacitor 502, a power module 504 that is constituted by a power conversion switching element, a gate board 506 for driving the power module 504, a control board 510 for controlling torque and speed of a motor/generator 508, and a current measurement device 512 for measuring 3-phase current required for the control. The inverter 500 is connected to a high-voltage battery 514 and the motor/generator 508.

Herein, the capacitor 502 absorbs a switching voltage ripple of the inverter 500 and performs a smoothing operation of suppressing rapid variation of a DC input voltage to allow the inverter 500 to normally operate and increase the durable lifespan of the high-voltage battery.

Typically, a film capacitor having voltage resistance and durable lifespan higher than an electrolytic capacitor is used as the capacitor 502. Although a film capacitor 502 has high voltage resistance and durable lifespan, a film cell in the film capacitor 502 is very vulnerable to temperature. Therefore, a cooling technology becomes a key point.

The inverter 500 may be mounted in a trunk room or an engine room depending on an electric power system of the hybrid vehicle. In the case when the inverter 500 is mounted on an engine room, the temperature of the engine room is very high, it is very important to cool the film capacitor 502 adopted in the inverter 500.

The above information disclosed in this Background Art section is only for enhancement of understanding of the background of the invention and therefore it may contain information that does not form the prior art that is already known in this country to a person of ordinary skill in the art.

SUMMARY

Embodiments of the present invention provide a film capacitor that can secure a stable operation and durable lifespan, even when an inverter adopting the film capacitor is mounted on a trunk room and an engine room, by effectively cooling heat generated from a film cell of the film capacitor.

A film capacitor according to the present invention includes a case in which a film cell is incorporated; and a heat radiating plate including a heat absorption unit that is positioned adjacent to but not in contact with the film cell for heat absorption and a heat radiating unit that is exposed to the outside of the case for heat radiation.

The film cell and the heat absorption unit of the heat radiating plate may be molded in an epoxy inside of the case altogether.

The case may be realized by a container of which one surface is opened and the heat radiating unit is exposed to the outside of the case through the opened surface of the case.

When the film capacitor is mounted on an inverter case, the heat radiating unit of the heat radiating plate may be interposed between an outer surface of the case and an inner surface of the inverter case and has ends that may be extended and bent so that both surfaces of the heat radiating unit are in surface contact with both the case and the inverter case.

The extended ends of the heat radiating unit may be bent to be widened from the surface the inner case by its elasticity when the film capacitor is not mounted on the inverter case.

In the case, a mounting flange for mounting the film capacitor may be integrally provided on the periphery of the opened surface while forming a mounting surface parallel to the opened surface and the heat radiating unit of the heat radiating plate may extend to overlap the mounting surface of the mounting flange.

A film capacitor according to the present invention can secure a stable operation and durable lifespan even when an inverter adopting the film capacitor is mounted on a trunk room and an engine room by effectively cooling heat generated from a film cell of the film capacitor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

DETAILED DESCRIPTION

Figure 1:
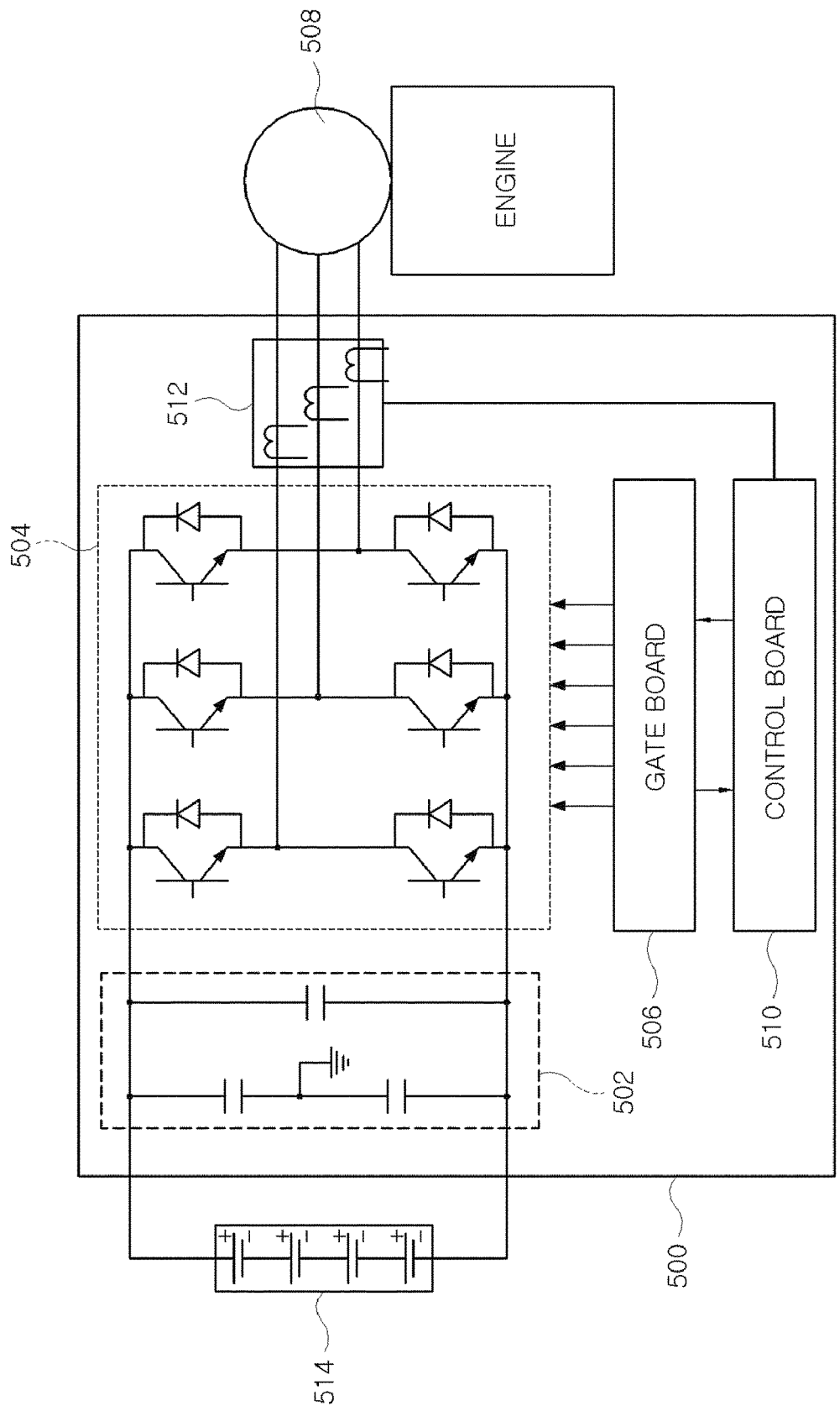
FIG. 1 is a diagram illustrating the configuration of a conventional inverter in a hybrid vehicle.
Figure 2:
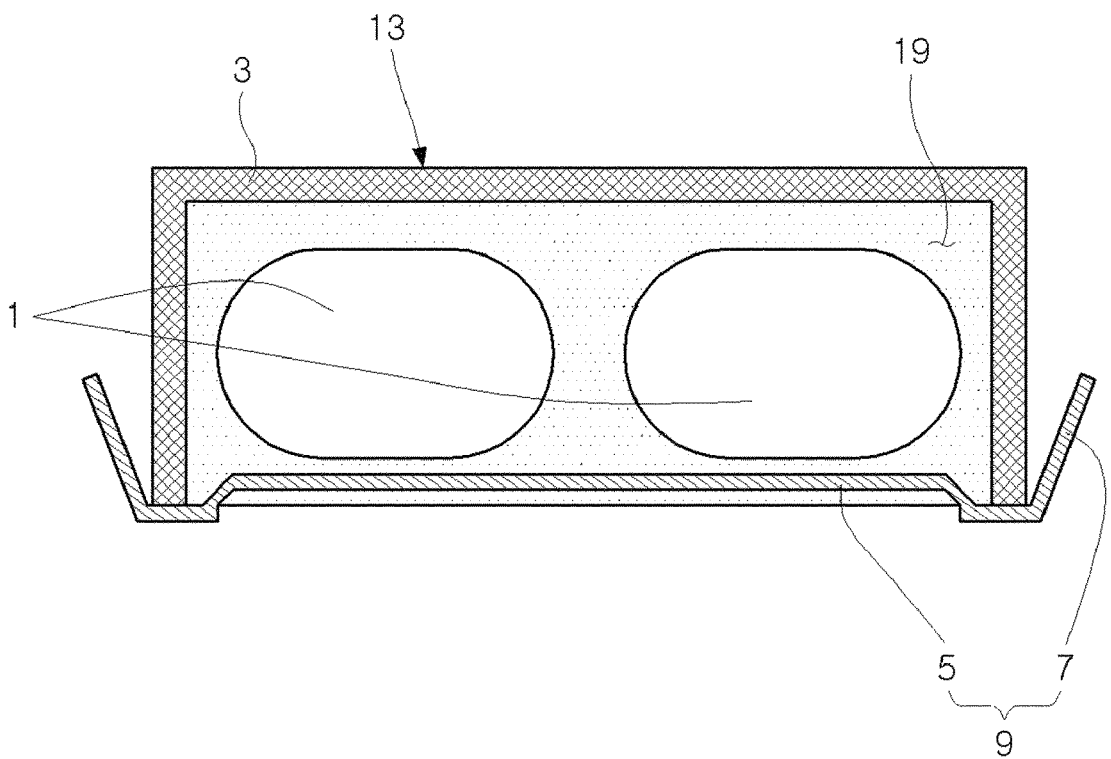
FIG. 2 is a cross-sectional view illustrating the structure of a film capacitor according to an embodiment of the present invention.
Figure 3:
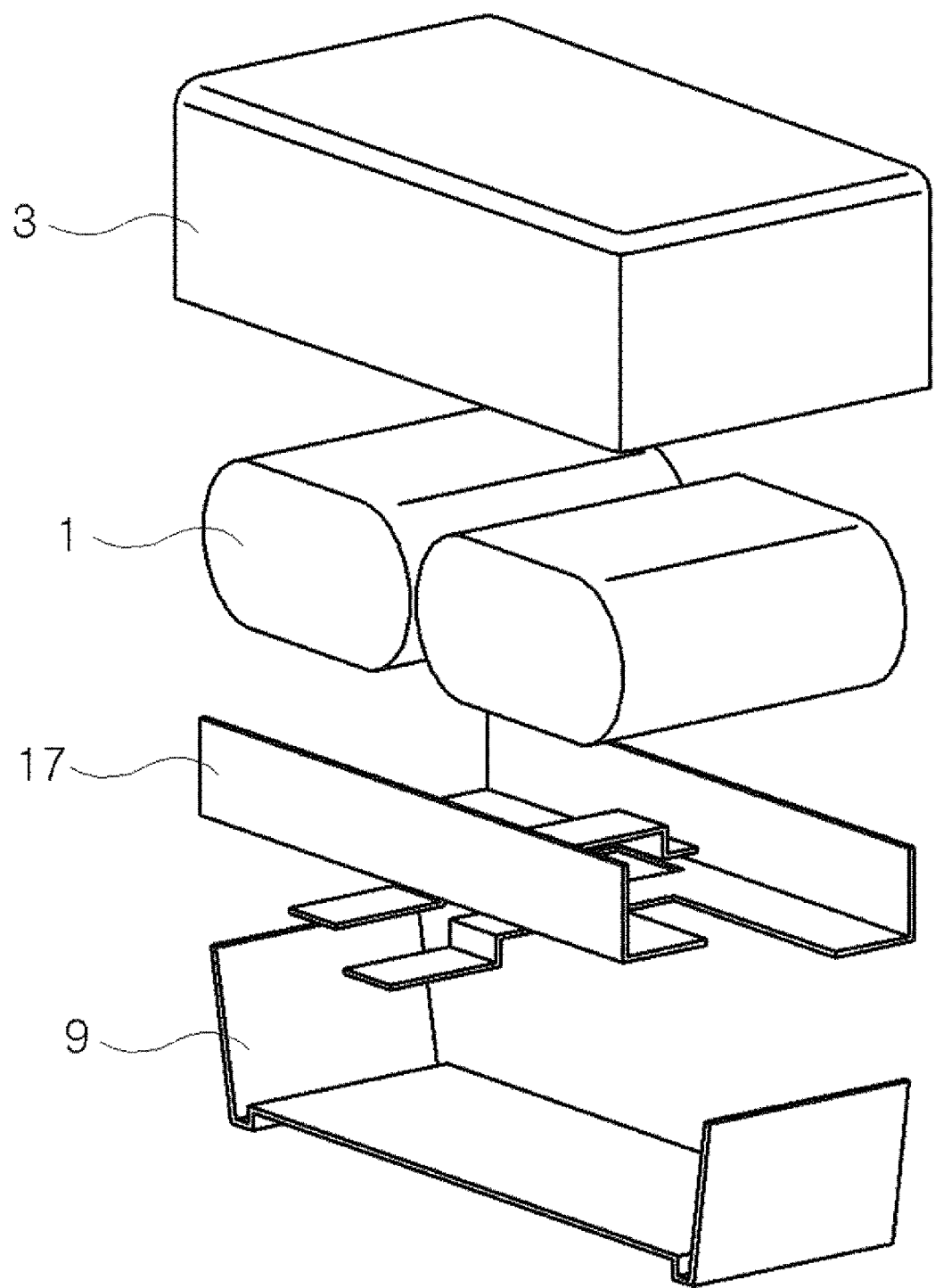
FIG. 3 is an exploded perspective view of the film capacitor of FIG. 2.
Figure 4:
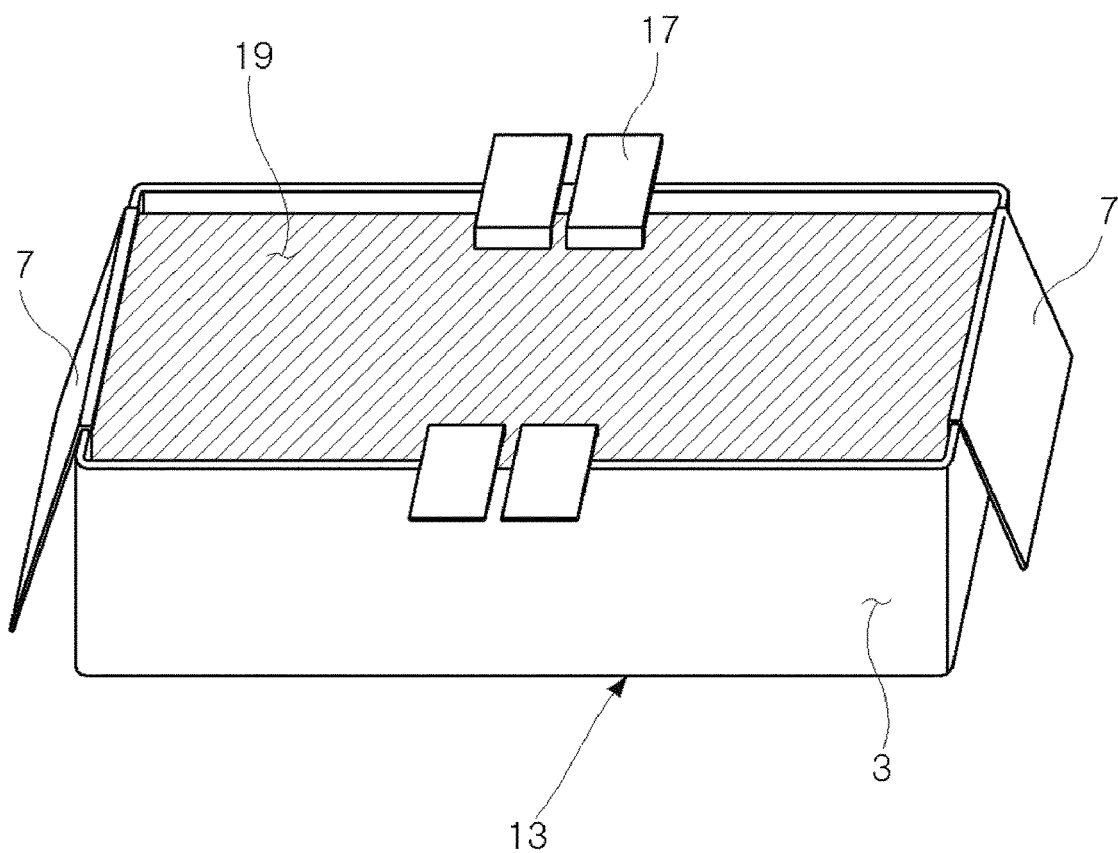
FIG. 4 is an assembled perspective view of the film capacitor of FIG. 3.

Referring to FIGS. 2 to 5, a film capacitor includes a case 3 and a heat radiating plate 9. The case 3 includes at least one film cell 1 therein. The heat radiating plate 9 includes a heat absorption unit 5 and a heat radiating unit 7. The heat absorption unit 5 and the heat radiating unit 7 may be formed integrally or in separate units. The heat absorption unit 5 is positioned adjacent to the film cell 1 while not being in contact with the film cell 1. The heat radiating unit 7 is exposed to the outside of the case 3.

The case 3 may be a container of which one surface is opened. In the heat radiating plate 9, the heat radiating unit 7 is exposed to the outside of the case 3 through the opened surface of the case 3. The film cell 1 and the heat absorption unit 5 may be molded in an epoxy inside the case 3 together with a bus bar 17 that is connected with the film cell 1 to secure an electrical connection state to the outside of the case 3, such that only the heat radiating unit 7 is exposed to the outside. The case 3 may be generally made of a plastic material with no conductivity. The heat radiating plate 9 may be primarily made of a metallic material.

Figure 5:
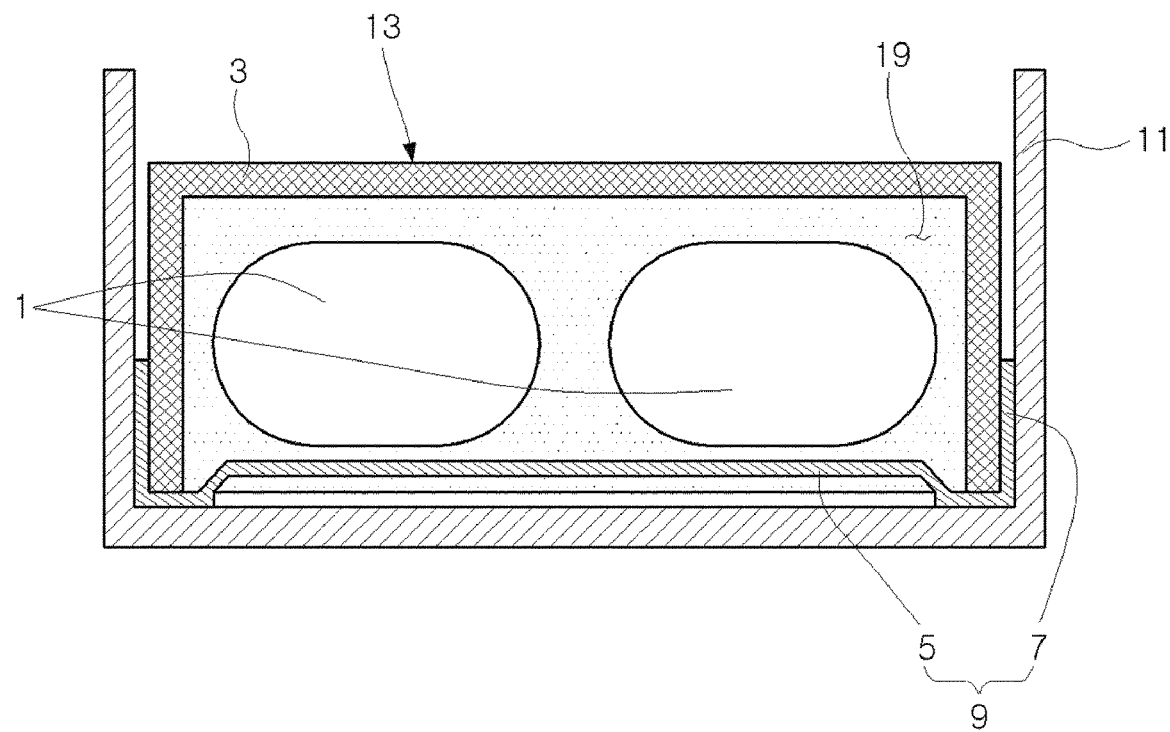
FIG. 5 is a diagram illustrating a state in which a film capacitor is mounted on an inverter case according an embodiment of the present invention.

Referring to FIG. 5, when a film capacitor 13 is mounted on an inverter case 11, the heat radiating unit 7 of heat radiating plate 9 is interposed between an outer surface of the case 3 and an inner surface of the inverter case 11 and has ends that are extended and bent so that both surfaces of the heat radiating unit 7 are in surface contact with both the case 3 and the inverter case 11.

That is, the heat radiating unit 7 of heat radiating plate 9 may become spontaneously in surface contact with the inverter case 11 when the film capacitor 13 is mounted on the inverter case 11. The extended ends of the heat radiating unit 7 may suitably be bent to be widened from the surface of the inner case 3 by its elasticity, when the film capacitor 13 is not mounted on inverter case 11, to thereby maintain close surface contact with the inverter case 11.

Accordingly, in an inverter adopting the film capacitor 13 having the above-mentioned structure, it is preferable that when the film capacitor 13 is inserted and mounted as shown in FIG. 5, the heat radiating plate 9 becomes in close contact with the inverter case 11 and the case 3 at once.

In the film capacitor 13 having the above-mentioned structure, since heat generated from the film cell 1 in the case 3 is smoothly absorbed through the heat absorption unit 5 of the heat radiating plate 9 and discharged to the outside through the heat radiating plate 9 to be rapidly cooled, it is possible to secure operational stability and durability of the film capacitor 13.

Figure 6:
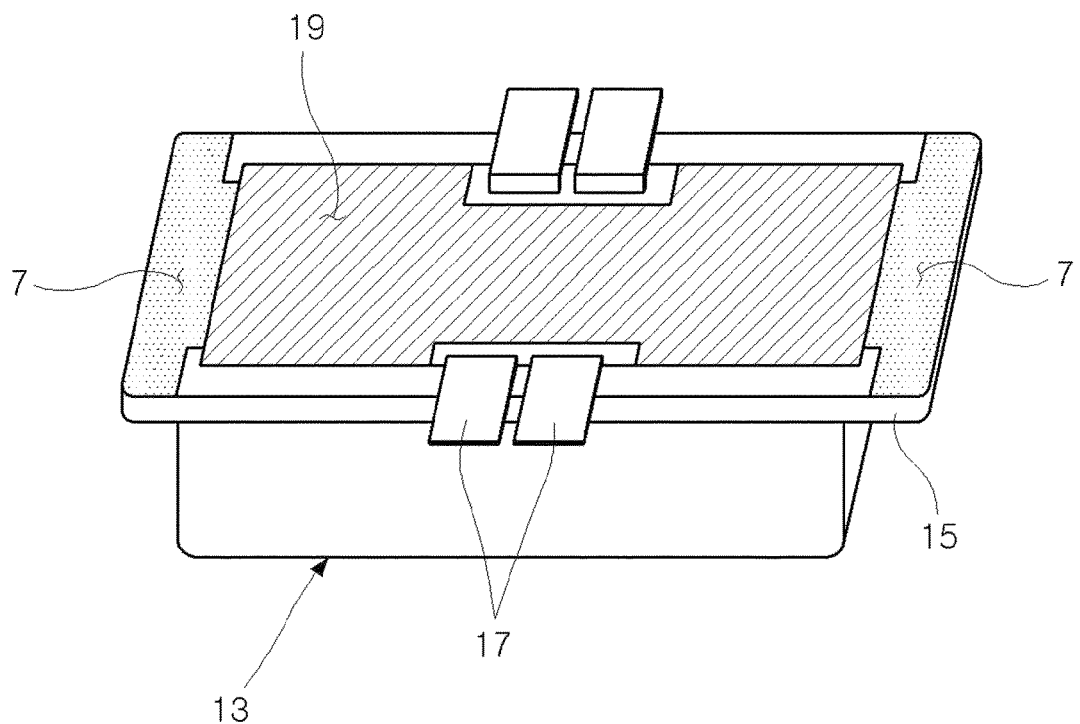
FIG. 6 is a diagram illustrating another embodiment of the present invention.
Figure 7:
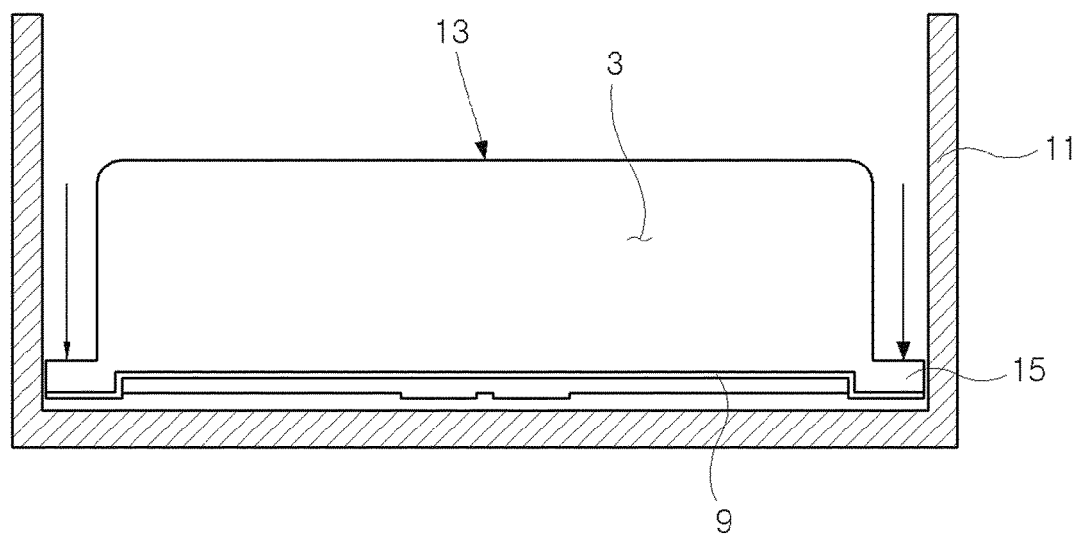
FIG. 7 is a diagram illustrating a state in which the film capacitor of FIG. 6 is mounted on an inverter case.

FIGS. 6 and 7 illustrate another embodiment of the present invention. A mounting flange 15 for mounting the film capacitor 13 is integrally provided on the periphery of the opened surface of the case 3, such that a mounting surface parallel to the opened surface is formed. The heat radiating unit 7 of heat radiating plate 9 extends so as to overlap the mounting surface of the mounting flange 15.

In the film capacitor 13, when the film capacitor 13 is mounted on the inverter case 11, the mounting flange 15 is closely mounted on the inverter case 11 with the heat radiating unit 7 of the heat radiating plate 9 interposed therebetween, such that the heat radiating unit 7 becomes spontaneously in close contact with the inverter case 11 in a surface contact state. Therefore, the heat generated from the film cell 1 is rapidly discharged to the inverter case 11 through the heat radiating plate 9.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A film capacitor, comprising:
    a case in which at least one film cell is incorporated, wherein a mounting flange for mounting the film capacitor is integrally provided on the periphery of an opened surface of the case while forming a mounting surface parallel to the opened surface; and
    a heat radiating plate including a heat absorption unit that is positioned adjacent to and not in with the film cell for heat absorption and a heat radiating unit that is exposed to the outside of the case for heat radiation, wherein the heat radiating unit of the heat radiating plate is interposed between an outer surface of the case and an inner surface of an inverter case and has ends that are extended and bent so that the heat radiating unit are in surface contact with both the case and the inverter case.

2. The film capacitor as defined in claim 1, wherein the film cell and the heat absorption unit of the heat radiating plate are molded by an epoxy inside of the case altogether.

3. The film capacitor as defined in claim 2, wherein the case is formed of a container of which one surface is opened and the heat radiating unit is exposed to the outside of the case through the opened surface of the case.

4. The film capacitor of claim 1, wherein the film capacitor is mounted on an inverter case.

5. The film capacitor of claim 1, wherein the extended ends of the heat radiating unit are bent to be widened from the surface of the inner case by its elasticity in the state where the film capacitor is not mounted on the inverter case.

6. The film capacitor of claim 1 wherein the heat radiating unit of the heat radiating plate extends to overlap the mounting surface of the mounting flange.

7. A film capacitor, comprising:
    a case in which at least one film cell is incorporated; and
    a heat radiating plate including a heat absorption unit that is positioned adjacent to and not in with the film cell for heat absorption and a heat radiating unit that is exposed to the outside of the case for heat radiation,
    wherein the heat radiating unit of the heat radiating plate is interposed between an outer surface of the case and an inner surface of an inverter case and has ends that are extended and bent so that the heat radiating unit are in surface contact with both the case and the inverter case.

* * * * *